US008516881B2

(12) United States Patent
Bastian et al.

(10) Patent No.: US 8,516,881 B2
(45) Date of Patent: Aug. 27, 2013

(54) TEST METHOD FOR BOGIES AS WELL AS TEST STAND AND ASSEMBLY STAND

(75) Inventors: Rainer Bastian, Borkheide (DE); Wolfgang Stumvoll, Lichtenau/Ot Ottendorf (DE)

(73) Assignee: AGG Anlagen- und Geraetebau GmbH, Potsdam (DE)

( * ) Notice: Subject to any disclaimer, the term of this patent is extended or adjusted under 35 U.S.C. 154(b) by 97 days.

(21) Appl. No.: 13/138,935

(22) PCT Filed: Apr. 27, 2010

(86) PCT No.: PCT/DE2010/050024
§ 371 (c)(1),
(2), (4) Date: Oct. 27, 2011

(87) PCT Pub. No.: WO2010/124686
PCT Pub. Date: Nov. 4, 2010

(65) Prior Publication Data
US 2012/0042720 A1   Feb. 23, 2012

(30) Foreign Application Priority Data
Apr. 27, 2009   (DE) .......................... 10 2009 002 678

(51) Int. Cl.
*G01M 17/10* (2006.01)
(52) U.S. Cl.
USPC ..................................................... 73/115.07
(58) Field of Classification Search
USPC ..................................................... 73/115.07
See application file for complete search history.

(56) References Cited

U.S. PATENT DOCUMENTS

| 340,883 | A | * | 4/1886 | Kells ............................... 33/651 |
| 2,442,491 | A | * | 6/1948 | Gieskieng et al. ........ 246/169 R |
| 2,452,480 | A | * | 10/1948 | Mason .......................... 246/246 |
| 3,820,016 | A | * | 6/1974 | Gieskieng ..................... 324/213 |
| 3,924,460 | A | * | 12/1975 | Lieb ................................. 73/146 |
| 4,787,318 | A | * | 11/1988 | Vogel ............................. 105/136 |
| 4,793,047 | A | * | 12/1988 | Curtis et al. ............... 29/407.08 |
| 6,564,467 | B1 | * | 5/2003 | Kay et al. ......................... 33/651 |
| 6,725,782 | B1 | * | 4/2004 | Bloom et al. ................... 105/27 |
| 7,469,479 | B2 | * | 12/2008 | Jager .............................. 33/1 Q |
| 8,261,671 | B2 | * | 9/2012 | Sakanoue et al. ............. 105/216 |
| 8,276,440 | B2 | * | 10/2012 | Wach et al. ................ 73/117.01 |
| 8,371,233 | B2 | * | 2/2013 | Kumar et al. ................... 105/75 |
| 2007/0203621 | A1 | * | 8/2007 | Haugen et al. ................. 701/19 |
| 2010/0204857 | A1 | * | 8/2010 | Forrest et al. .................. 701/19 |

FOREIGN PATENT DOCUMENTS

| DE | 26 01 259 A1 | 7/1977 |
| EP | 1 918 689 A2 | 5/2008 |
| GB | 2 266 123 A | 10/1993 |

* cited by examiner

*Primary Examiner* — Freddie Kirkland, III
(74) *Attorney, Agent, or Firm* — Kriegsman & Kriegsman

(57) ABSTRACT

The invention relates to a test method for bogies (12) and a test stand suitable for carrying out the method, said test stand being additionally suitable for disassembling and assembling components of corresponding bogies (12). According to the proposed solution, the loads incurred by a bogie during its intended use are simulated in a known manner on a test stand designed for this purpose on the still unfinished bogie (12). To this end, forces are directed into the bogie (12) such as those caused by the weight of a car body and by other operation-related load conditions. The effect of these load conditions on the bogie (12) and/or of a track on which the bogie (12) runs is described by measured values, which are obtained by means of measuring sensors and are computer-processed. According to the invention, a respective force, used for the simulation of load conditions, is applied not as a pressure force, but rather as a tensile force acting directly on the bogie (12) or on a test stand element mounted directly on said bogie.

19 Claims, 3 Drawing Sheets

TEST METHOD FOR BOGIES AS WELL AS TEST STAND AND ASSEMBLY STAND

Figure 1:
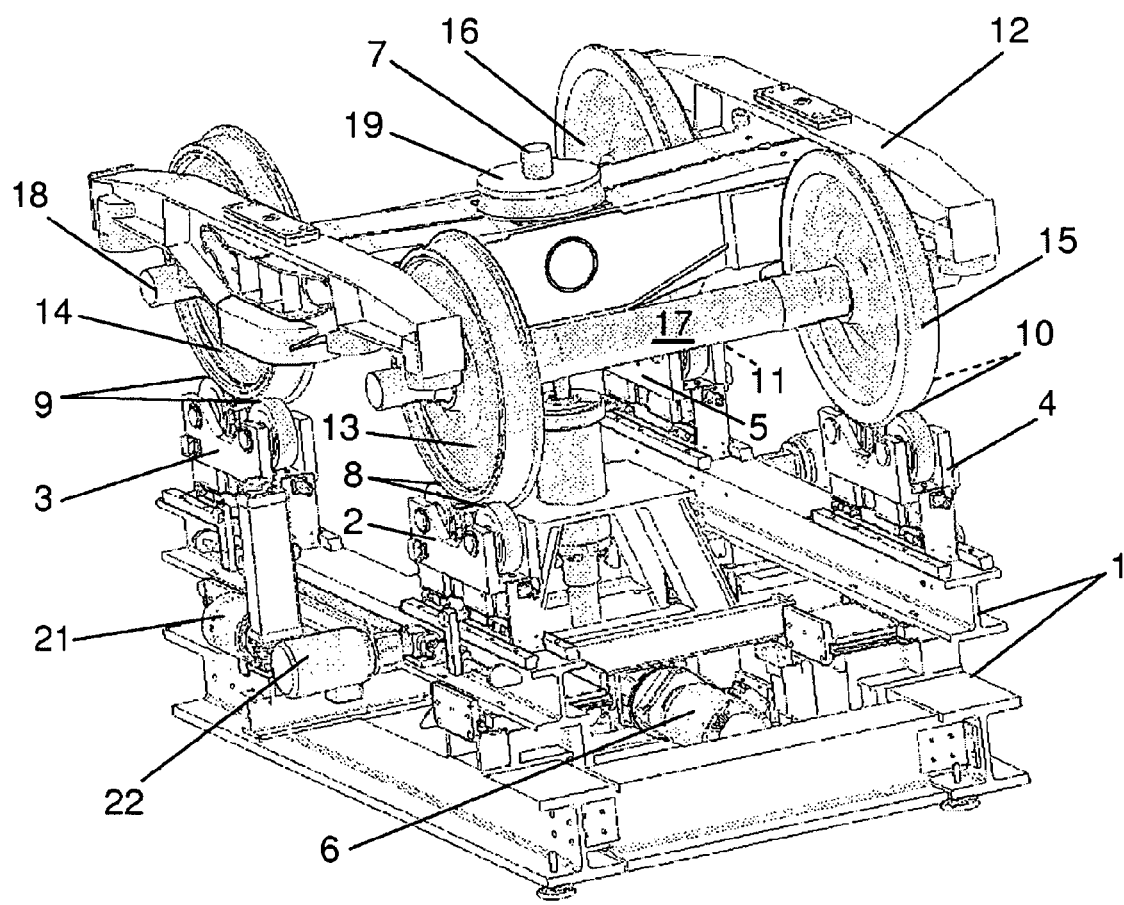

The invention relates to an approach for testing bogies of rail vehicles. It relates to a corresponding test method and a test stand suitable for performing the method, which is also suitable as an assembly stand for assembling and disassembling components of a corresponding bogie.

In conjunction with the design of bogies and the design of rail vehicles and/or cars with which the corresponding bogies are used as well as for their maintenance and monitoring, it is necessary to determine wheel loads, bogie heights and other variables of bogies under load. Special bogie test stands are used for this purpose. By using such test stands, the forces acting on a respective bogie due to a car body equipped with it and due to different operation-induced load states are simulated. For this purpose, forces corresponding to the aforementioned bogie test stands are introduced into the uninstalled bogie and the resulting variables such as the wheel loads, which the wheels exert on the rail are determined with the help of special measured value pickups, and at least one evaluation unit that processes the data of the measured value pickups.

With known bogie test stands, the respective bogie, which has not yet been installed, is raised onto a test track or is driven there, the track being arranged on a rail carrier and supported via a corresponding substructure with respect to the substrate, the substructure usually being provided with a foundation. At least one measuring chamber having at least one measured value pickup is situated on the two rails of the test track. The wheel loads are usually measured by means of shear rods arranged in the test chambers.

In underground and underfloor variants of generic bogie test stands, the track carrier supporting the test track and the respective substructure are arranged in a trench. To induce the forces required for the measurements, a load yoke which is deported by supporting pillars mounted on both sides of the trench and together with them forms a portal spanning the pitch is arranged above the trench. The forces, which serve to simulate various load states, are applied from above to the respective bogie to be tested by means of corresponding equipment situated at this portal. For positioning for the test procedure, the respective bogie is raised to a track situated in front of and/or behind the test track and is pulled or pushed from it into the proper measurement position beneath the portal onto the measurement track. Since the portal with the load yoke spans the test track, it is impossible to raise the bogie directly onto the test track.

In addition, above-ground variants of bogie test stands having essentially the same design are known. These have the advantage that during the test, the bogie is situated at the working level of the persons performing the test. However, it is necessary here to statically secure the track support and its substructure which support the test track by means of comparatively complex foundation structures. In such a variant, at least one ramp section before and/or behind the test track is necessary. It is designed in the form of a roll-in or scissors lifting platform, by means of which the bogie is dragged or pushed onto the test track. With regard to the requirement of corresponding ramp areas and the installation space required for the portal, bogie test stands of the aforementioned type are quite large and are therefore designed to be stationary.

For cost reasons, it is not generally possible for operators of small fleets of vehicles to install a corresponding bogie test stand in the area of their workshops and service facilities. They must therefore have the required testing on the bogies performed in installations belonging to external providers. However, this is often associated with waiting times and means that in order to always be able to offer a corresponding freight capacity, companies must have a redundant number of cars or wagons with the respective bogies. However, this also leads to increased costs. It would therefore be desirable in the short term to create more flexible approaches which would enable companies to perform the testing at their own locations in case of need using bogies available there without requiring that they keep a cost-intensive technology on hand for this purpose. For logistic reasons it would be extremely advantageous if the testing could be conducted on site at the respective company.

Because of the aforementioned installation size and the applications required for a statically reliable construction, however, it is fundamentally impossible to install bogie test stands of the type described previously to allow a company to test its technology on site as needed. This is true in particular with regard to the requirement of a local reinstallation of the portal with the load yoke also for the overhead variants of such test stands. Furthermore, such test stands are extremely sensitive arrangements from the standpoint of measurement technology and their equipment must at any rate be recalibrated for the measurement in complex procedures in the event of a transfer.

A test stand development by the present applicant, which is designed according to the prior art described above is illustrated in FIG. 3 as an example. Furthermore, U.S. Pat. No. 4,793,047 has disclosed a comparable unit for adjusting the weight distribution in an asymmetrical 3-axle chassis of a locomotive. For determining the given weight description, the chassis is loaded simultaneously with a compressive force acting from above at four load points. Each of the load points is situated between two axles on both sides of the chassis so that the respective means provided on one side of the chassis for input of the load into the load points of the respective side are joined to one another via a transverse bar. To this extent, this device also has a portal-type design which necessitates a substantial installation size and is not designed for operation at changing sites of use.

The object of the invention is to provide a more flexible approach to testing bogies of rail vehicles in comparison with the prior art. For this reason, a method is to be provided and a bogie test stand which will allow this method to be implemented is to be made available, preferably also being suitable as an assembly stand for assembling and disassembling as well as adjusting components of bogies. The corresponding test stand and assembly stand should also require less installation space in comparison with the approaches used for bogie test stands known from the prior art.

This object is achieved by a method having the features of the main claim. A bogie test stand and/or a test and assembly stand which achieves this object is/are characterized by the first device-based claim. Advantageous embodiments and/or refinements of the invention are characterized by the respective dependent claims.

As is known from the prior art, according to the test method for bogies which achieves the object, the loads occurring on a bogie, when used as intended, are simulated on the bogie on a test stand designed for this purpose, where the bogie has not yet been installed. To this end, forces are introduced into the bogie such as those which occur in its operational use due to the gravitational force of a car body and due to other operational load states. The effect of these load states on the bogie and/or on a track on which the bogie is traveling are described by measured values obtained by measured value pickups on the test stand and then processed by computer. In deviation from the prior art, however, the forces which serve to simulate load states are not applied to the bogie to be tested as compressive forces from above but instead according to the invention, the respective force to be applied for simulation of an operating state is applied as a tensile force acting directly on the respective bogie or on an element of the test stand resting directly on this bogie.

The procedure described here, i.e., the type of introduction of force into a bogie to be tested, which procedure has been modified in comparison with the prior art, makes it possible to design a device embodied for testing bogies to be very compact and space saving, as is shown in the representative of the test stand and assembly stand according to the invention. This is based on the fundamental consideration that is it possible to simulate the compressive forces that occur on a bogie in its operational use for the purpose of testing by means of tensile forces of the same amount acting from the opposite direction.

According to possible embodiments of the invention, the wheel loads or axle loads acting on a track via the bogie under the simulated operating conditions are determined by means of measured value pickups arranged in a measurement device carrier of the test stand designed accordingly. Further the test method may include the determination of the respective height of the bogie under different load states. As is known from the prior art, the height of the bogie is defined as the distance between a mark on the bogie and the upper edge of the rail head of a track. This distance in other words the height of the bogie may be determined by means of optical sensors situated on a suitably designed test stand for example. Furthermore, it is possible to determine the parallelism of the wheel disks with respect to an axle and/or the parallelism of the axles of a bogie under the influence of load forces on the bogie, i.e., in accordance with the basic idea of the invention, under the influence of corresponding tensile forces. Optical sensors are also preferably used for this purpose.

As already explained in the introduction, the force which serves to simulate a load state may act on the bogie either directly or indirectly via an additional element. According to one possible procedure in which the force acts directly on the bogie, the respective tensile force from the direction of the track acts on the top side of the bogie pivot of a bogie. To this end, an element which transmits the tensile force is passed through the bogie pivot and attached to its top side.

Another variant of this method is based in particular on testing bogies which are equipped with pneumatic springs or sliding blocks. The respective tensile force acts from the direction of the track centrally on the lower wide of a yoke which is contact with the pneumatic springs and/or sliding blocks of the bogie centrally between two axles of the bogie. By means of the yoke a uniform application of force on the two outer sides of the bogie as well as an asymmetrical load can be simulated.

A test stand and assembly stand for bogies of rail vehicles which solves this problem is equipped with measurement device carriers situated on a supporting structure beneath a bogie that is to be tested, as well as being equipped with means for creating and transferring inductive forces for simulation of operational load states into the bogie which is positioned with its wheels on contact points of the measurement carrier but is as yet uninstalled, also equipped with measured value pickups for detecting effects induced by the simulated load states on the bogie and/or on the contact points of its wheels and finally equipped with at least one evaluation unit and with operating elements.

According to the invention, the corresponding test and assembly stand is designed so that at least one motor and the means for converting a torque induced by the motor into a tensile force acting on the bogie from the direction of the supporting structure are arranged on it for simulating the load states for the bogie. The motor for generating the forces simulating the load states is preferably arranged below the plane of the contact points of the wheels of the bogie. Without a significant increase in effort for converting the engine torque into the respective required tensile force and from the standpoint of a space-saving design, however, an arrangement of the motor approximately at the level of the contact points of the bogie is fundamentally also conceivable. In any case the basic idea of the invention consists of shifting the means which are arranged above the test track, i.e., above the bogie and its wheel load points in and/or on a portal with traditional known test stands for generating a compressive force, which is used for the simulation, to a lower position, preferably arranging it below the level of the wheel load points and applying the respective force required as a tensile force with the help of said means. In this way a compact design of the test and assembly stand is achieved, making an arrangement of an additional portal fastened to the bottom of the test stand on both sides unnecessary.

Due to the compact design described here, extremely space-saving test stands and/or assembly stands can be implemented. In addition, the device according to the invention makes it possible to design such a test stand and assembly stand to be mobile. According to an advantageous embodiment of the invention, all the aforementioned elements of the test stand and assembly stand, including the motor and the means for converting its torque into the tensile force acting on the bogie to be tested are therefore optionally arranged on a frame, apart from the at least one evaluation unit and the operating elements. Such a frame and the elements arranged thereon for implementation of the test functions form a compact unit which can be loaded without the requirement of dismantling of elements of the test stand and moved to a site for use. Because of the integral design of this unit, it is not necessary to perform extensive adjustment or calibration jobs such as in particular adjusting the measured value pickups on site. The system is instead immediately ready for use. The units required for more extensive evaluation of the measured values picked up by the measured value pickups and any control modules for operation may also be installed directly on the contact unit or may also be simply linked to the other electric and/or electronic components of the unit at the site of use via corresponding interfaces provided on the unit, preferably standard interfaces, or via a bus system.

In the embodiment as a mobile unit in particular, the test and assembly stand is designed so that the plane of the contact points of the wheels of the bogie to be tested is arranged at the working height of an operator standing up when the frame is standing on the ground. This makes it possible to perform all the operations for testing a bogie in a working position which is convenient for the operator. In its property as an assembly stand, this device also allows components of the bogie which can be installed or adjusted only under load to be assembled and/or disassembled conveniently or to be adjusted accordingly.

For converting the torque of the motor which generates the forces for simulation of the load conditions into the respective tensile force, i.e., for converting the rotational movement of the motor into a translatory movement, there are various possibilities. According to one embodiment of the invention, the rotational movement of the motor shaft is converted by a deflection gear into a translatory movement, which is transmitted to the bogie via a tension rod or tension spindle which can be connected to the deflection gear and the bogie standing on the supporting structure of the test stand and assembly stand. Furthermore, for converting the rotational movement into a translatory movement, the use of at least one tension cable and pulleys may be considered. Another possibility is provided by the use of at least one hydraulic cylinder operated by the motor.

The test stand and assembly stand according to the invention is preferably further embodied in that the distance between the contact points and/or the measurement device carriers is adjusted by means of spindles that are operated manually or by motor in accordance with the respective rail gauge and the axle base of a bogie to be tested. The measured value pickups arranged on the test stand and assembly stand preferably include at least measurement chambers which can be positioned beneath the wheels of the bogie to be tested and in which shear rods are arranged for detecting the wheel loads acting on a track via the wheels when the bogie is used as intended. The measurement device carriers which have already been mentioned several times with the measurement chambers preferably arranged in them for detecting wheel loads may be arranged in or on the rails of a measurement track, as is known from the prior art.

In an especially advantageous embodiment of the invention, however, the measurement device carriers are embodied as displaceable prism pickups which can be positioned according to the axle base of a bogie to be tested. These prism pickups are preferably designed as rolling prisms which thus make it possible to drive the wheels of the bogie without any change in position of the bogie. The wheels are driven by means of the motor which is also used to generate the forces simulating the load states, via a corresponding gear or by means of one or more motors additionally arranged on the test stand and assembly stand.

Figure 2:
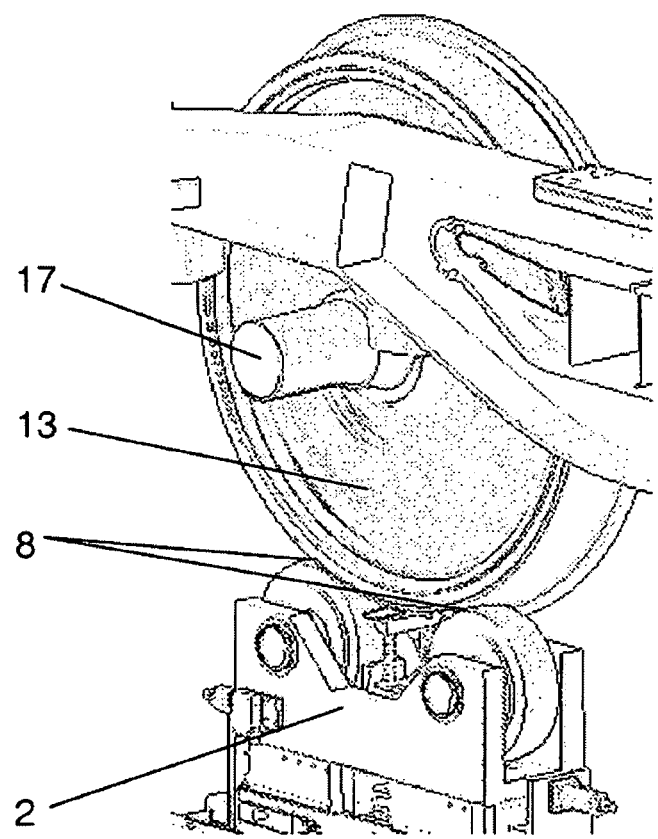
Figure 3:
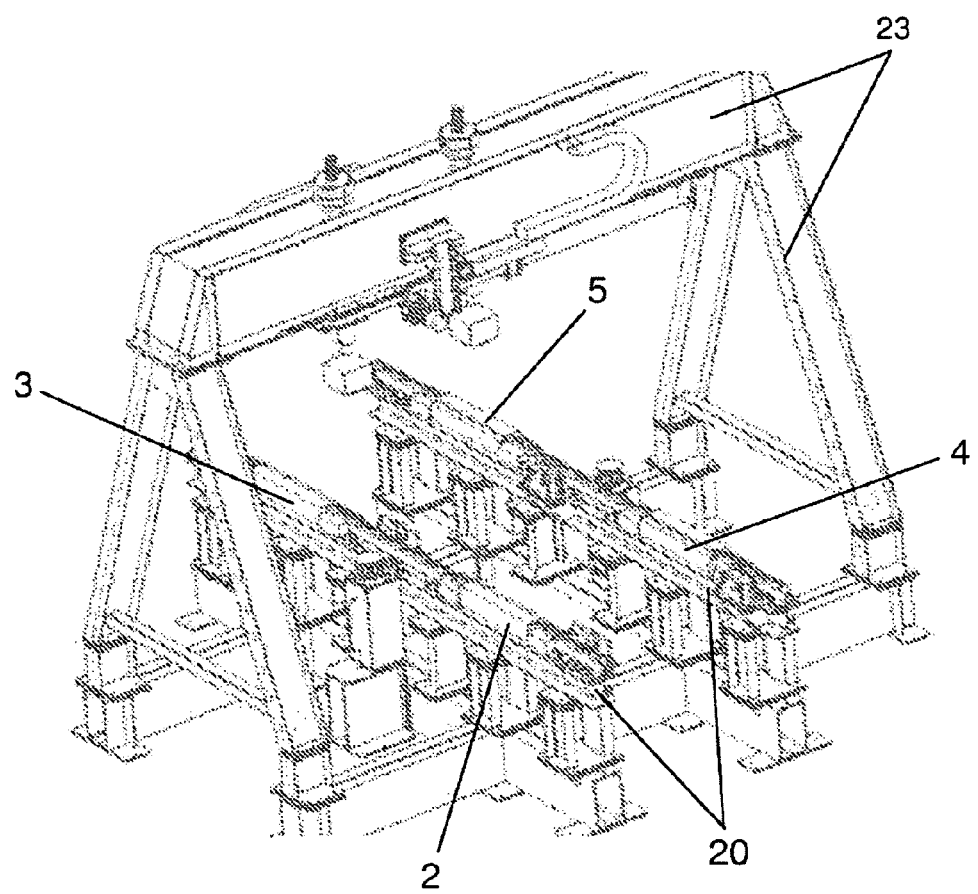

Individual aspects of the invention will be explained in greater detail below on the basis of the drawings where one of the drawings shows a test stand according to the prior art for the purpose of comparison. The drawings show in detail:

FIG. 1: an exemplary embodiment of the test stand and assembly stand according to the invention, FIG. 2: a measurement carrier of the test stand and assembly stand according to FIG. 1, FIG. 3: a test stand for bogies according to the prior art.

FIG. 3 shows the test stand for bogies of rail vehicles such as that known from the prior art as explained in the introduction of the invention. This diagram relates to an overhead variant of such a test stand which is shown in the drawing without the required roll-in and/or scissors lifting platform. The most important elements of this test stand include a test track 20 with measurement device carriers 2, 3, 4, 5 arranged on it and a portal 23 with a load yoke extending transversely above the test track. The test track 20 and the portal 23 with the load yoke are supported on a joint substructure. Two measurement device carriers 2, 3, 4, 5 are arranged on each of the two rails of the test track 20, with one measurement chamber with shearing rod elements for determining wheel loads being formed in each measurement device carrier. For simulation of load states occurring during operation, forces are introduced into a bogie (not shown in this drawing) which is positioned on the test track 20, via means arranged on the load yoke of the portal 23 for this purpose. The forces generated by means of corresponding units on the load yoke are applied from above as compressive forces. The effects occurring on the bogie and/or on the test track beneath it because of these simulated loads are detected by means of the measured value pickups arranged in the measurement device carriers 2, 3, 4, 5. This drawing shows that a bogie to be tested cannot be raised directly into the test stand because of the portal 23 arranged above the test track 20. The bogie must instead be dragged onto the test track 20 by means of a roll-in and/or scissors lifting platform (not shown) as mentioned above. In this way and due to the suitably wide and high portal 23, the test stand has a substantial size which necessitates a substantial installation space for its location. If the overhead variant shown here is to be regarded as being a mobile unit to be supplemented merely by a corresponding roll-in and/or scissors lifting platform, it is immediately clear that the loading and transport of such a unit is much more difficult due to the design with the portal 23 and/or necessitates partial dismantling of the test stand. One result of the latter circumstance is that the test stand must first be installed again at the site of use and then must be calibrated.

On the other hand, FIG. 1 shows one possible embodiment of the test stand and assembly stand according to the invention. According to the basic idea of the invention, the means for creating the forces simulating the load states and the elements for transferring them to the bogie to be tested are moved downward here. To do so, a motor 6, which generates the corresponding forces, is situated beneath the plane of the wheel load points 8, 9, 10, 11 of the bogie 12. Its torque which can be picked upon a motor shaft (not visible in the diagram) is transferred via a deflection gear (also not visible in the diagram) to a tension rod 7. The tension rod 7 is guided by the bogie pivot 19 of the bogie 12, which is to be tested and is positioned on the test stand and assembly stand and is attached to it. The rotational movement of the motor 6, which is converted by the deflection gear into a translatory movement generates a force which acts as a tensile force on the bogie pivot 19 via the tension rod 7 due to its being attached to the bogie 12. The wheels 13, 14, 15, 16 of the bogie 12 are positioned on rolling prisms by means of which measurement device carriers 2, 3, 4, 5 are formed, each of which has a measurement chamber accommodating at least one shear rod arranged therein. In an essentially known way the wheel loads which occur in different load states simulated by corresponding tensile forces can be determined by means of the measured value pickups in the form of shear rods. The measurement devices carriers 2, 3, 4, 5 and/or rolling prisms are displaceable and/or positionable with respect to the axle base and the wheel base of the respective bogie 12 to be tested, this positioning being accomplished by means of additional motors 21, 22 arranged on the stand. All the essential elements of the test stand, namely the measured value pickups, which are arranged in the measurement device carriers 2, 3, 4, 5 designed in the form of rolling prisms, as well as the means which serve to position the measurement device carriers 2, 3, 4, 5 and the motor 6 for generating the forces simulating the load states and the tension rod 7 for transmitting the forces simulating the load states—all these elements are arranged on a compact frame 1, as shown in the figure. The corresponding frame 1 is of such dimensions that the plane of the wheel load forces 8, 9, 10, 11 is situated at the working height of an operator who is standing up. Therefore in addition to the testing work, assembly work and/or adjustment work can be performed on the bogie 12 very conveniently.

The entire arrangement is optionally completed by electrical and/or electronic units (not shown here) for operation and technical computer processing of the measured variables detected by the measured value pickups. However, corresponding units may optionally also be connected to the electrical and/or electronic elements in particular the motor 6 which is to be controlled in accordance with the respective load states to be simulated and the measured value pickups of the test stand, optionally also in the form of an operating platform via standard interfaces. The figure shows that test stand and assembly stand in this compact embodiment may serve as a mobile unit which is comparatively simple to load and can be brought to an operator of corresponding rail vehicle for testing of bogies 12 and can be operated almost directly on site without any major effort.

FIG. 2 again shows a detail of the test stand and assembly stand according to FIG. 1, showing here again a measurement device carrier 2 in the form of a rolling prism and a wheel 13 of a bogie 12 positioned thereon. By means of the two rollers of the roller prism, the corresponding wheel 13 and/or an axle 17, 18 of the bogie 12 can be driven so that, for example, the smooth running of the tires can be measured and/or tested.

| List of reference numerals | |
|---|---|
| 1 | Supporting structure, for example, a frame |
| 2, 3, 4, 5 | Measurement device carrier |
| 6 | Motor |
| 7 | Tension rod or tension spindle |
| 8, 9, 10, 11 | Contact points |
| 12 | Bogie |
| 13, 14, 15, 16 | Wheel |
| 17, 18 | Axle |
| 19 | Bogie pivot |
| 20 | Test track |
| 21, 22 | Motor |
| 23 | Portal |

The invention claimed is:

1. A test method for bogies of rail vehicles according to which the forces occurring on a bogie when used as intended and caused by the gravitational force of a car body and operational load states are simulated on a test stand designed for this purpose, using an as yet uninstalled bogie and its effect on the bogie and/or on a track on which the bogie travels is described by means of measured values obtained by measured value pickups of the test stand and processed by computer, characterized in that the respective force introduced into the bogie to be tested for simulation of an operating state is applied as a tensile force acting directly on the respective bogie or on an element of the test stand resting directly on said bogie.

2. The test method according to claim 1, characterized in that by means of measured value pickups arranged in a measurement device carrier of the test stand, the wheel loads acting on a track under the simulated operating conditions via the bogie and each of its wheels when used as intended are determined.

3. The test method according to claim 1, characterized in that the axle loads acting on a track via the bogie under the respective simulated operating conditions, and each of its axles when used as intended are determined by means of measured value pickups arranged in a measurement device carrier of the test stand.

4. The test method according to claim 1, characterized in that the height of the bogie defined as the distance between a mark on the bogie and a track is determined by means of measured value pickups arranged on the test stand for individual simulated operating states.

5. The test method according to claim 1, characterized in that the parallelism of the wheel disks and/or the parallelism of the axles of the bogie with respect to the wheels of an axle of the bogie is/are determined by means of measured value pickups arranged on the test stand or individual simulated operating states.

6. The test method according to claim 1, characterized in that the respective tensile force acts on the top side of the bogie pivot of the bogie from the direction of the track, such that an element which transfers the tensile force is passed through the bogie pivot.

7. The test method according to claim 1, characterized in that in the case of a bogie equipped with pneumatic springs or sliding blocks, the respective tensile force acts from the direction of the track centrally on the lower side of a yoke which rests centrally on the pneumatic springs or the sliding blocks between two axles of the bogie.

8. A test stand and assembly stand for bogies of rail vehicles having measurement device carriers arranged on a supporting structure beneath a bogie to be tested, also having means for generating and transmitting forces introduced into the bogie which is positioned on the measurement device carriers but has not yet been installed, its wheel being situated at contact points on the measurement device carriers, also being equipped with measured value pickups for detecting effects induced by the simulated load states on the bogie and/or at the contact points of its wheels as well as with at least one evaluation unit for processing the measured values detected by the measured value pickups and with operating elements, characterized in that at least one motor and means for converting a torque induced by the motor into a tensile force acting on the bogie from the direction of the supporting structure are arranged on the test stand and assembly stand for simulation of the load states for the bogie.

9. The test stand and assembly stand according to claim 8, characterized in that the motor for generating the forces simulating the load states is arranged beneath the plane of the contact points of the wheels of the bogie.

10. The test stand and assembly stand according to claim 8, characterized in that it is designed as a mobile and compact unit, such that apart from the at least one evaluation unit and the operating elements, at least all other elements of the test stand and assembly stand mentioned above, including the motor and the means converting its torque into the tensile force acting on the bogie to be tested are arranged on the supporting structure which is designed in the form of a frame.

11. The test stand and assembly stand according to claim 10, characterized in that the plane of the contact points of the wheels of the bogie is arranged at the working height of an operator standing up in the case of the frame standing on the ground.

12. The test stand and assembly stand according to claim 8, characterized in that the rotational movement of the motor is converted into a translatory movement by a deflection gear, this translatory movement being transferred to the bogie via a tension rod which can be coupled to the deflection gear and the bogie standing on the supporting structure, and the translatory movement induces the tensile force acting on the bogie for simulation of a load state.

13. The test stand and assembly stand according to claim 8, characterized in that the rotational movement of the motor is converted by at least one tension cable and pulleys into a translatory movement acting on the bogie to be tested.

14. The test stand and assembly stand according to claim 8, characterized in that at least hydraulic cylinder is arranged on it for converting the torque of the motor into the tensile force acting on the bogie.

15. The test stand and assembly stand according to claim 8, characterized in that the distance between the contact points and/or the measurement device carriers is adjustable according to the axle base and the respective rail gauge of a bogie to be tested.

16. The test stand and assembly stand according to claim 8, characterized in that the measured value pickups comprise at least measurement chambers which can be positioned beneath the wheel of the bogie to be tested by means of the measurement device carriers, having shear rods arranged in them for detecting the wheel loads acting on a track via the wheels in use of the bogie as intended.

17. The test stand and assembly stand according to claim 8, characterized in that the measurement device carriers are arranged in or on the rails of a test track.

18. The test stand and assembly stand according to claim 8, characterized in that the measurement device carriers are designed as displaceable prism pickups which can be positioned in accordance with the axle base of the bogie.

19. The test stand and assembly stand according to claim 18, characterized in that the prism receptacles are designed as rolling prisms so that it is possible to drive the wheels of a bogie without a change in position executed by the bogie, such that the wheels are driven by means of the motor to create the forces simulating the load states or by means of one or more additional motors arranged on the test stand and assembly stand.

* * * * *